United States Patent Office 3,437,655
Patented Apr. 8, 1969

3,437,655
LACTAMS FROM CYCLO-ALIPHATIC KETOXIMES BY THE BECKMANN REARRANGEMENT EMPLOYING HCl AS CATALYST
Johan W. Garritsen, Geleen, and Johan A. Bigot, Beek, Netherlands, assignors to Stamicarbon N.V., Heerlen, Netherlands
No Drawing. Filed May 13, 1964, Ser. No. 367,212
Claims priority, application Netherlands, May 14, 1963, 292,749
Int. Cl. C07d 41/06
U.S. Cl. 260—239.3                                15 Claims

ABSTRACT OF THE DISCLOSURE

This invention is directed to the Beckmann Rearrangement of cycloaliphatic oximes to produce lactams, employing HCl as the Beckmann Rearrangement catalyst.

---

The present invention relates to the preparation of lactams from the corresponding cyclo-aliphatic ketoximes by the so-called Beckmann rearrangement.

This rearrangement reaction, which is best known for the preparation of ε-caprolactam on an industrial scale, is carried out in practice by means of concentrated sulphuric acid, in most cases with oleum.

Although good lactam yields are obtained using sulphuric acid in the rearrangement reaction, the quality of the product is poor and careful purification is necessary to obtain pure lactam suitable for polymerization. Additionally, in neutralizing the product of the rearrangement reaction, large amounts of alkali metal sulphate or ammonium sulphate are obtained as a by-product, and the sulphate also has to be carefully purified before it can be utilized, mainly as a fertilizer component.

It has previously been suggested (U.S. Patent No. 2,797,216) to use hydrogen chloride for reaction with a cyclo-aliphatic ketoxime, dissolved in an organic solvent, to form the oxime hydrochloride, followed by rearrangement of the reaction product to the corresponding lactam in the conventional way using sulphuric acid, the hydrochloric acid being recovered in this step. Attempts have also been made (A. Striegler, Journal für praktisch Chemie, 4th series, part 15, Nos. 1 and 2 (1962)) to prepare caprolactam by thermal rearrangement of cyclohexanone oxime hydrochloride in various solvents but due to resin formation these experiments failed to yield caprolactam.

According to the present invention, it has now been found that cyclo-aliphatic ketoximes can be made to yield the corresponding lactams if the oxime is reacted as oxime hydrochloride with hydrogen chloride. The lactam can be recovered from the reaction product as lactam hydrochloride, or, if so desired, as the free base by decomposition of the lactam hydrochloride.

The starting material in the process according to the invention is an oxime in the form of oxime hydrochloride. As is know, an oxime can be converted into the readily crystallizing oxime hydrochloride by adding to the oxime an equimolecular amount of hydrogen chloride. The oxime hydrochloride can take up more hydrogen chloride, and is then converted into an oxime hydrochloride oil, which also may be used as a starting material in the process according to the invention.

If use is made of oxime hydrochloride oil containing more than the equimolecular amount of hydrogen chloride with respect to the oxime, for example, 1.1 moles, 1.5 moles, 1.9 moles, or 2 moles of hydrogen chloride per mole of oxime, the starting material already contains sufficient hydrogen chloride for the rearrangement to lactam hydrochloride to be realized. However, in order to achieve complete rearrangement, it is usual to add more hydrogen chloride, e.g., 2, 5 or 10 times the amount contained in the starting material. Additionally, it is possible to pass a stream of gaseous hydrogen chloride through the reaction mixture in a recycle flow.

The reaction may be carried out by introducing gaseous hydrogen chloride into molten oxime so as to form the oxime hydrochloride. Thereafter, the rearrangement to lactam hydrochloride takes place as an exothermic reaction in the presence of hydrogen chloride.

Due to the formation of lactam hydrochloride, the reaction mixture becomes highly viscous and in order to keep the reaction mixture fluid, the temperature may be raised. However, at high temperatures, about 160° C., the formation of undesirable resinification products must be considered and may result in a low lactam yield, e.g., one which in most cases is not higher than 25–30 mole percent with respect to the amount of oxime.

The reaction can also be carried out in a liquid repartition agent. For instance, a hydrocarbon, such as toluene, xylene, heptane, may be used as the repartition agent. When a repartition agent is used, the exothermic reaction can be better controlled and undesirably high local temperature increases can be prevented. If the process is carried out in this way, the reaction product is a suspension of lactam hydrochloride in the vehicle.

In a preferred embodiment of the invention, the reaction is carried out with the aid of a nonaqueous solvent in which both the oxime hydrochlorides and the lactam hydrochlorides are soluble. Suitable solvents are, for instance, the nitro compounds of hydrocarbons, such as nitromethane, nitropropane, nitrobenzene, nitrocyclohexane; the halogenated hydrocarbons, such as chlorobenzene, chloroform, trichlorethylene, isopropyl chloride; and nitriles, such as acetonitrile, benzonitrile, adiponitrile.

The amount of solvent utilized may be varied within wide limits. Thus, for example, the amount of solvent may be 200, 500, or even 1,000% by weight based on the weight of oxime used as starting material. On the other hand, much smaller amounts of solvent may be used, e.g., 10, 25 or 50% by weight of the oxime. If small amounts of solvent are used, part of the oxime may at first be present as a solid substance in suspension, the solid being dissolved as the reaction proceeds. Additionally, part of the lactam hydrohalide formed may be present as a solid substance in the reaction mixture.

The temperature at which the reaction is carried out is usually maintained between 50 and 125° C. This can be done in a relatively simple manner since the reaction is exothermic. Thus, it is possible to start the reaction at a lower temperature, for instance, room temperature, with a rise in temperature taking place as the reaction proceeds.

The reaction may be carried out at any desired pressure. Usually, the process is carried out at atmospheric pressure, but it is also possible to use higher pressures, e.g., 5, 10, 25, 50 or 100 atm., or even more. If an elevated pressure is used, a larger amount of hydrogen chloride may be present in the reaction mixture. It is also possible to work at reduced pressure. In this event, the temperature and pressure may be adjusted so that the repartition agent or the solvent utilized boils during the reaction, part of the same being discharged in the vapor state, and recycled after condensation.

The reaction may also be carried out in the presence of catalysts. Such substances as phosgene and halogenated organic nitrogen compounds, e.g. 1.3.5-trichloro-S-triazine, 2.4-dibromopyrimidine, imide-chlorides, such as 2-chloro-azacycloalkene, and amide-chlorides, such as 2-chloro-azoalkene, have been found to promote the formation of lactam. It is not necessary to use large amounts of these catalysts. For example, very small amounts in the order of 0.1–1 mole percent with respect to the oxime, will be sufficient. If the process is carried out in continuous operation, it is not always necessary to add a catalyst, since the catalyst is of most importance as an initiator to start the reaction.

It has been found that the course of the reaction is favorably influenced by the presence of lactam in the reaction mixture. It is, therefore, advisable to add at the start of the reaction an amount of lactam or lactam hydrochloride, e.g., 0.5–5 mole percent with respect to the oxime. In a continuous process, part of the reaction product can be recycled to provide the desired lactam content in the reaction mixture. This also makes it possible to control the reaction temperature in a very simple fashion.

After completion of the exothermic reaction, the lactam hydrochloride can be crystallised by cooling the reaction product and can be separated from the solution, for instance, by filtration. The mother liquor can be recycled for use in the reaction mixture. The lactam hydrochloride can be decomposed by means of a base, for instance ammonia, and the lactam can be recovered in the form of the free base, if desired. It is also possible to decompose the resulting lactam hydrochloride thermally, and to remove the lactam thus obtained by distillation.

The invention is illustrated, but not limited, by the following examples.

EXAMPLE 1

In a 1-liter reaction vessel equipped with a stirrer, a reflux cooler and a gas inlet tube, 113 g. of cyclohexanone oxime (1 mole) were mixed with 200 ml. of acetonitrile, after which 40 g. of gaseous hydrogen chloride (1.1 moles) were introduced at room temperature.

Subsequently the temperature was raised and maintained at 75° C. for 2 hours, after which the rearrangement was completed. After the acetonitrile had been removed by distillation, the reaction product was dissolved in water and the solution neutralized with sodium bicarbonate. The resulting solution, which was saturated with common salt, was extracted with benzene. After removal of the benzene, 81 g. of product were obtained (caprolactam content 63% by weight).

In this example, in which a very small amount of hydrogen chloride was used, the yield was 45%.

EXAMPLE 2

In a 3-liter reaction vessel equipped with a stirrer and a reflux cooler, 93 g. of cyclohexanone oxime-hydrochloride oil (consisting of 0.5 mole of oxime and 1 mole of hydrogen chloride) were mixed with 200 ml. of acetonitrile. Subsequently the temperature was raised and kept at 75–80° C. for 1 hour, in which time a further amount of 744 g. of the oxime-hydrochloride oil was slowly added to the reaction mixture.

After cooling to the room temperature the reaction product was a crystalline mass of lactam hydrochloride. The reaction product, dissolved in water, was neutralized with ammonia, and the acetonitrile was removed together with the water by distillation at reduced pressure (15 mm. Hg).

By dissolving in benzene followed by filtration the caprolactam was separated from the ammonium chloride. After removal of the benzene, 490 g. of product (caprolactam content 92%) were obtained, representing a yield of 88.6%.

EXAMPLE 3

Using the apparatus described in Example 1, 56.5 g. of cyclohexanone oxime were mixed with 100 ml. of xylene and 100 ml. of acetonitrile, after which 30 g. of hydrogen chloride were introduced at a temperature of 10–15° C. Thereafter, the temperature was maintained at 75–80° C. for 1 hour, in which time a further quantity of 30 g. of hydrogen chloride was introduced.

The acetonitrile was then removed by distillation, and subsequently the residual mixture was boiled while nitrogen was passed through it, the hydrogen chloride being entrained with the nitrogen.

Upon distillation of the resulting lactam solution in xylene 52 g. of crude lactam (caprolactam content 87% by weight) were separated corresponding to a yield of 80%.

EXAMPLE 4

In the apparatus described in Example 1, 56.6 g. of cyclohexanone oxime were mixed with 200 ml. of benzonitrile, after which 30 g. of hydrogen chloride were introduced at room temperature. Thereafter, the temperature was kept at 105°–110° C. for one hour, while a further amount of 30 g. of hydrogen chloride was introduced.

Subsequently, the benzonitrile was removed by distillation at reduced pressure, the reaction product dissolved in water, and the solution neutralized with ammonia. Extraction with benzene yielded a lactam solution, from which 51 g. of crude lactam (caprolactam content 85% by weight) were recovered, representing a yield of 76.9%.

EXAMPLE 5

Example 4 was repeated except that, instead of benzonitrile, 200 ml. of nitropropane were used, and the reaction temperature was maintained at 110°–114° C.

The yield was 45 g. of crude lactam (caprolactam content 89% by weight) representing an efficiency of 70.9%.

EXAMPLE 6

Example 4 was repeated except that 200 ml. of nitromethane were used instead of benzonitrile and the reaction temperature was 95°–100° C.

The yield was 73.1%.

EXAMPLE 7

Using the apparatus described in Example 1, 63.5 g. of cycloheptanone oxime were mixed with 200 ml. of acetonitrile, after which 30 g. of hydrogen chloride were introduced at room temperature. The temperature was then maintained at 70–75° C. for 1 hour, in which time another 30 g. of hydrogen chloride were introduced.

After removal of the acetonitrile by distillation, the reaction product was suspended in benzene and filtered. Upon washing with benzene, 77 g. of crude oenantholactam hydrochloride (content 93% by weight) were obtained corresponding to a yield of 88.1%.

EXAMPLE 8

Example 7 was repeated using 70.5 g. of cyclo-octanone oxime.

The yield was 87 g. of crude caprylolactam hydrochloride (content 85% by weight) representing an efficiency of 83.3%.

EXAMPLE 9

Using the apparatus of Example 1, 56.5 g. of cyclohexanone oxime were dissolved in 200 ml. of acetonitrile, 0.5 g. of phosgene was added to the solution, and an amount of 40 g. of hydrogen chloride was thereafter introduced at room temperature. The temperature of the exothermic reaction that occurred was maintained at 70–75° C.

After 45 minutes the acetonitrile was removed by distillation and the reaction product was processed as described in Example 4.

The yield was 54 g. of crude lactam (caprolactam content 91% by weight), representing an efficiency of 87%.

EXAMPLE 10

Example 9 was repeated except that instead of phosgene, 0.2 g. of 2-chloro-azacycloheptene was added.

The yield was 54 g. of crude lactam (caprolactam content 90% by weight), or 86%.

EXAMPLE 11

Example 9 was repeated except that instead of phosgene, 0.4 g. of 1.3.5-trichloro-S-triazine was added.

The yield was 53 g. of crude lactam (lactam content 91% by weight), representing an efficiency of 85.5%.

EXAMPLE 12

In a pressure vessel with a capacity of 1 liter, equipped with a stirrer, 56.5 g. of cyclohexanone oxime were dissolved in 200 ml. of chloroform, after which 0.5 g. of phosgene and 40 g. of hydrogen chloride were added. The temperature was then maintained at 85–90° C. for 1 hour during which time the pressure was maintained at 15 atm. by the introduction of nitrogen.

After the chloroform had been removed by distillation the reaction product was processed in the manner described in Example 4.

The yield was 55 g. of crude lactam (caprolactam content 90% by weight), representing an efficiency of 87.7%.

It will be appreciated that the present invention offers a number of advantages over past techniques for preparing lactams by rearrangement. For example, the process of the invention avoids the use of sulphuric acid and the resulting formation of ammonium sulphate which is not a particularly desirable byproduct.

As will be appreciated from the above, the invention herein is useful for rearranging cyclo-aliphatic ketoximes broadly, for example, those containing up to 12 carbon atoms. Various other modifications over and above those described herein may also be made in the invention. Hence, the scope of the invention is defined in the following claims wherein:

What is claimed as new is:

1. A process for preparing a lactam which comprises reacting a hydrochloride of a cyclo-aliphatic ketoxime having 6 to 12 carbon atoms in the oxime ring with hydrogen chloride.

2. The process of claim 1 wherein the cycloaliphatic ketoxime is selected from the group consisting of cyclohexanone oxime, cycloheptanone oxime and cyclooctanone oxime.

3. The process of claim 1 wherein the lactam is recovered from the resulting reaction product as lactam hydrochloride.

4. The process of claim 1 wherein the resulting lactam hydrochloride is decomposed and the lactam is recovered in the free base form.

5. The process of claim 1 wherein the starting material is an oxime hydrochloride containing more than the equimolecular amount of hydrogen chloride, and the reaction is carried out without any further addition of hydrogen chloride.

6. The process of claim 5 wherein the reaction is carried out in a liquid repartition agent.

7. The process of claim 1 wherein the oxime is reacted in the presence of lactam hydrochloride.

8. The process of claim 1 wherein the reaction is carried out in the presence of a catalyst.

9. Process according to claim 8 wherein the catalyst is selected from the group consisting of phosgene and halogenated organic nitrogen compounds.

10. The process of claim 1 wherein said reaction is carried out at 50–125° C.

11. The process of claim 1 wherein said reaction is carried out in the presence of a nonaqueous solvent for the oxime hydrochloride and the corresponding lactam hydrochloride.

12. The process of claim 11 wherein said solvent is selected from the group consisting of nitrohydrocarbons, halogenated hydrocarbons and nitriles.

13. The process of claim 7 wherein the amount of lactam present is about 0.5 to 5 mol percent with respect to said oxime.

14. The process of claim 1 wherein said reaction is carried out by heating an oxime hydrochloride oil at a temperature below 160° C.

15. The process of claim 1 wherein gaseous hydrochloric acid is passed into liquid oxime and the resulting oxime hydrochloride is rearranged to lactam hydrochloride.

References Cited

UNITED STATES PATENTS

| | | | |
|---|---|---|---|
| 2,234,566 | 3/1941 | Lazier et al. | 260—293.3 |
| 2,249,177 | 7/1941 | Schlack | 260—239.3 |
| 2,883,377 | 4/1959 | Von Schick | 260—239.3 |
| 3,094,520 | 6/1963 | Hopkins | 260—239.3 |
| 3,167,542 | 1/1965 | Rapp | 260—239.3 |

OTHER REFERENCES

Chapman "J. Chem. Soc." (1935) pp. 1223–9.

Ingold "Structure and Mechanism in Organic Chemistry," pp. 496–7 (Cornell) (1954).

Gould "Structure and Mechanism in Organic Chemistry," pp. 618–621 (Holt) (1959).

HENRY R. JILES, *Primary Examiner.*

R. T. BOND, *Assistant Examiner.*